United States Patent
Kiselev et al.

(12) 
(10) Patent No.: US 6,454,216 B1
(45) Date of Patent: Sep. 24, 2002

(54) REUSABLE BOOSTER FOR THE FIRST STAGE OF A LAUNCHER

(75) Inventors: Anatoly Ivanovich Kiselev; Alexandr Alexeevich Medvedev; Jury Nikolaevich Trufanov; Igor Sergeevich Radugin; Jury Leonidovich Kuznetsov, all of Moscow; Alexandr Alexandrovich Pankevich, Moskovskaya oblast; Gennady Fedorovich Naboischikov; Vladimir Mikhailovich Ushakov, both of Moscow, all of (RU)

(73) Assignee: Federalnoe Gosudarstvennoe Unitarnoe Predpriyatie "Gosudarstvenny Kosmichesky Nauchno-Proizvodstvenny Tsentr IM.M.V.Khrunicheva", Moscow (RU)

( * ) Notice: Subject to any disclaimer, the term of this patent is extended or adjusted under 35 U.S.C. 154(b) by 0 days.

(21) Appl. No.: 09/869,273
(22) PCT Filed: Oct. 13, 2000
(86) PCT No.: PCT/RU00/00407
  § 371 (c)(1),
  (2), (4) Date: Aug. 8, 2001
(87) PCT Pub. No.: WO01/30653
  PCT Pub. Date: May 3, 2001

(30) Foreign Application Priority Data

Oct. 26, 1999 (RU) .......................................... 99122487

(51) Int. Cl.[7] ............................................... B64G 1/62
(52) U.S. Cl. ....................................... 244/160; 244/162
(58) Field of Search ................................ 244/160, 162, 244/158 R, 49, 2, 161

(56) References Cited

U.S. PATENT DOCUMENTS 3,702,688 A * 11/1972 Faget ........................ 244/1 R (List continued on next page.)

FOREIGN PATENT DOCUMENTS

| DE | 3740645 A1 | * | 6/1989 | ............ B64G/1/40 |
| FR | 2713593 | | 6/1995 | |
| WO | 93/09030 | | 5/1993 | |

OTHER PUBLICATIONS

L.B. Leschiner, I.E. Ulyanov, "Designing Fuel Systems for Airplanes", 1975, pp. 102–103.

(List continued on next page.)

Primary Examiner—Peter M. Poon
Assistant Examiner—Timothy D Collins
(74) Attorney, Agent, or Firm—Burns, Doane, Swecker & Mathis, L.L.P.

(57) ABSTRACT

A booster comprises a body including tanks for an oxidizer and fuel, a nose compartment with a dome, a between-tank section and an afterbody, a rocket engine installation, an all-moving wing with a unit for turning it and fixing in a position along the axis of the booster during the ascension step and in a position turned by 90° during the return flight, horizontal and vertical fin assemblies, a triple-point support landing gear, aerodynamic control organs and units for jointing to the second stage of the launch vehicle. The booster is provided with an air-feed jet engine installation, comprising two engines with air intakes mounted in the nose compartment, and with gas-line extensions with exhaust nozzles extending beyond the bypasses of the external contours of the nose compartment, and a propellant system with propellant tanks in the wing, working and balancing tanks in the nose compartment. A wing is mounted on the upper surface of the booster body in the area of the between-tank section. Horizontal and vertical fins are mounted on the afterbody and are made respectively in the form of a stabilizer consisting of two all-moving consoles with a small negative V-shaped angle, and a fin with a yaw rudder. The dome of the nose compartment is made in the form of a portion of a sphere and has two inlet apertures for the aforesaid air intakes, closed by one turning plug.

7 Claims, 9 Drawing Sheets

U.S. PATENT DOCUMENTS

| | | | |
|---|---|---|---|
| 4,834,324 A | | 5/1989 | Criswell |
| 4,842,218 A | * | 6/1989 | Groutage et al. ........ 244/137.4 |
| 5,031,857 A | * | 7/1991 | MacConochie et al. ..... 244/172 |
| 5,090,642 A | * | 2/1992 | Salkeld .................... 244/137.1 |
| 6,360,994 B2 | * | 3/2002 | Hart et al. .............. 244/158 R |

OTHER PUBLICATIONS

I.I. Anureev, "Reusable Rockets", 1975, pp. 146–147.

Mark G. Benton, "Reusable, Flyback Liquid Rocket Booster for the Space Shuttle", Journal of Spacecraft and Rockets, vol. 26, No. 4, Jul.–Aug. 1989, pp. 252.

* cited by examiner

REUSABLE BOOSTER FOR THE FIRST STAGE OF A LAUNCHER

FIELD OF THE INVENTION

The invention relates to the field of rocket-space engineering and may find use during the creation of all-azimuth rocket systems for the ascent of space objects to reference orbits in a wide range of inclinations without cession of land for the field into which spent boosters fall.

BACKGROUND OF THE INVENTION

At present different projects of reusable boosters of the first stages of launch vehicles are known which are equipped with lifting aerodynamic surfaces and landing gear in order to carry out after the end of operation of the midflight engines, separation of the booster from the launch vehicle and entrance into the atmosphere of flight in the atmosphere and landing on an airdrome. This makes it possible to solve the problem of ecological safety during the launching of the launch vehicle and to reduce the cost of delivering a useful load into orbit.

Known, in particular, is a reusable booster of the first stage of a launch vehicle for the variant of modernization of the reusable transport cosmic system "Space Shuttle." The booster comprises a body including tanks for the oxidizer and fuel, a nose compartment with a dome, between-tank section and afterbody, a rocket engine installation positioned in the afterbody, a wing mounted on the body according to a low-phase scheme behind the between-tank section, a forward horizontal fin assembly on the nose compartment above the wing, a vertical fin, an air-feed jet engine installation comprising six turbojet engines positioned on the lower surface of the wing and four turbojet engines on the lower surface of the body, and a triple-point support landing gear consisting of two main supports positioned in the area of the root chords of the wing consoles, and a front support positioned in the nose compartment (see M. G. Benton, Reusable, Flyback Liquid Rocket Booster for the Space Shuttle, Journal of Spacecraft and Rockets, VII–VIII 1989, vol. 26, N4, p. 252, FIG. 1). The construction of the booster provides for its return and horizontal landing in the area of the launch complex. However drawbacks of this construction of a reusable booster are the large size (spread) of the wing consoles, and the use of this technical solution would result in substantial changes in the construction of the launch complex. Substantial dimensions of the wing consoles also result in an increase of the wind loads on the whole construction of the launch vehicle during the active portion of the ascent, which increases the weight of not only the reusable booster itself, but also the following stages of the launch vehicle and, as a consequence thereof, to additional losses of the weight of the useful load. Furthermore, the positioning of the lifting surfaces in accordance with the "cleat" scheme causes problems in ensuring balance, stability and controllability during all potions of the flight. An additional drawback of this construction is the positioning of the turbojet engines on the wing consoles and the lower surface of the body, which requires thermal protection of the engines themselves, which also increases the weight of the booster.

A reusable booster of the first stage of a launch vehicle is also known which comprises a rocket assembly and an airframe, which are made in the form of separate monoblock units, combined by power link units. The rocket assembly is provided with midflight engines and jet control system engines. The nose part of the rocket assembly is closed with a dome. The airframe has a fuselage, two folding wing consoles, a folding rear fin, a pullout aerodynamic flap and landing gear. The wing consoles are provided with turning axles positioned in a diametral plane passing in the area of the center of the weight of the booster construction. In the folded position, the wing consoles are arranged forward along the fuselage and disposed with edges in slots thereof, forming a triangular wing of small length with the possibility of forming a wing of large length in the open position. The tail fin assembly in the open position has a V-shaped form and may be equipped with two air-feed jet engines for a return flight of the booster to the airdrome near the launching point of the launch vehicle. The landing gear consists of a main support, a front support and auxiliary under-wing supports (see Russian Federation patent No. 2053936, class B 64 G 1/100, 1/14, Feb. 10, 1996). Mounting the air-feed jet engines on the consoles of the tail fin assembly makes the construction of the tail fin assembly more complex and requires thermal protection of the engines themselves, which results in an increase of the weight of the booster. The presence of a balanced flap and turning consoles of the wing make the balancing of the booster significantly more complex throughout the whole range of flight speeds. The small distance from the aerodynamic focus of the fin assembly to the center of the mass of the booster results in a drastic increase of the area of the fin assembly and, accordingly, its weight. Embodiment of the rocket assembly and the airframe in the form of separate monoblocks increase the weight of the booster as a whole. Furthermore, unfolding the consoles in the atmosphere significantly changes the aerodynamics of the booster and results in the necessity of solving problems of ensuring stabilization and control.

The booster most similar to the claimed invention in respect to the combination of material features is the reusable booster of the first stage of a launch vehicle, comprising a body including tanks for an oxidizer and fuel, a nose compartment with an elongated dome, between-tank section and afterbody, a rocket engine installation, a straight all-moving wing mounted on a flat lower surface of the body with a unit for turning it and fixing in a position along the axis of the booster during the ascension step and in a position turned by 90° during the return flight, vertical and horizontal fin assemblies, each of which consists of two pullout plates positioned respectively on the consoles of the wing and in the nose compartment, a triple-point support landing gear consisting of two main supports mounted on the booster body in the region of the between-tank section, and a front support positioned in the nose compartment, and aerodynamic control organs (see U.S. Pat. No. 4,834,324 class 244/160, B 64 G 1/14, May 30, 1989). The all-moving wing provides optimization of the appearance of the launch vehicle during the ascent and the possibility of arranging the reusable booster in existing installations during servicing between flights. However, the known booster has a number of drawbacks:

Return to this booster after separation from the second state of the launch vehicle is only possible in a gliding flight, since an air-feed jet engine installation is not provided in the makeup of the booster. Therefore, separation of the first and second stages of the launch vehicle is carried out at a low height and low speed, which results in an increase in the weight of the second stage and, accordingly, reduction of the weight of the useful load;

The forward positioning of the horizontal fin assembly does not provide acceptance balancing of the reusable booster to be returned for its flight in the range of the angle of incidence of 40–50° after separation from the launch vehicle and 3–10° during the return flight and landing;

Positioning a vertical fin assembly on the wing consoles does not provide a sufficient degree of stability of the booster because of its small length during the return flight in the whole range of speeds and angles of incidence, which results in the necessity of increasing its area. Furthermore, the construction of the wing becomes more complex and additional drives appear to open the vertical fin assembly;

The construction of the unit for turning the wing by 90° and moving it along the body during the return flight of the booster is very complex and increases the weight of the booster;

Retraction of the main supports of the chassis into the body of the booster requires an unconventionally large power section between the tanks, which significantly increases the weight of the booster;

The presence of an elongated nose dome additionally increases the weight of the booster;

The arrangement and construction of the booster does not provide for its use as a booster of the first stage in a tandem scheme launch vehicle.

The object to the solution of which the claimed invention is directed is the creation of a reusable booster of the first stage of a launch vehicle on the base of a standard rocket block, the construction of which would ensure during return flight longitudinal trim during all stages of the flight in the atmosphere with the provision for minimum deviation of the pressure center from the weight center under conditions relating to the predetermination of the construction and arrangement of the initial rocket block and imposing limits on the positioning of the lifting surfaces and on the range of possible longitudinal centering.

Another object of the invention is to create a reusable booster of the first stage of a launch vehicle, the construction of which would provide during the return flight:

Highly effective dissipation of energy at high speeds with the simultaneous turning of the booster towards the launch-landing complex;

The necessary level of aerodynamic quality at subsonic speeds during the cruise;

Satisfaction of the stability and controllability requirements while ensuring stabilization against agitations and performance of the necessary maneuvers;

Provision of the necessary level of carrying properties during the landing modes to carry out landing at an acceptable speed.

One more object of the invention is to create a reusable booster of a first stage of a launch vehicle, the arrangement and construction of which would ensure its use as a booster of the first stage in both tandem and in packet schemes of a launch vehicle.

DISCLOSURE OF THE INVENTION

The stated objects are attained in that a reusable booster of the first stage of a launch vehicle, comprising a body including tanks for an oxidizer and fuel, a nose compartment with a dome, a between-tank section and an afterbody, a rocket engine installation, a straight all-moving wing with a unit for turning it and fixing in a position along the axis of the booster during the ascension step and in a position turned by 90° during return flight, vertical and horizontal fin assemblies, a triple-point support landing gear consisting of two main supports mounted on the booster body, and a front support positioned in the nose compartment, aerodynamic control organs and units for joining to the second stage of the launch vehicle, in accordance with the invention is provided with an air-feed jet engine installation, comprising two engines with air intakes mounted in the nose compartment, and a propellant system with main propellant tanks in the wing, working and balancing tanks in the nose compartment. A wing is mounted on the upper surface of the booster body in the area of the between-tank section. Horizontal and vertical fins are mounted on the afterbody and are made respectively in the form of a stabilizer consisting of two all-moving consoles with a small negative V-shaped angle, and a fin with a yaw rudder. The engines of the air-feed jet installation are provided with gas-line extensions with exhaust nozzles extending beyond the bypasses of the external contours of the nose compartment and closed by aerodynamic domes. The exhaust nozzles are shifted from the surface of the booster body and their axes are deflected from the surface of the oxidizer tank. The dome of the nose compartment is made in the form of a portion of a sphere and has two inlet apertures for the aforesaid air intakes, closed by one turning plug, provided with a drive mounted in the nose compartment.

The booster may be provided with a jet control system during the exoatmospheric portion of the return flight and during the initial stage of the atmosphere flight, consisting of two removable modules, each of which is arranged inside the dome of the exhaust nozzle of an engine of the air-feed jet installation.

The unit for fixing the wing in a position along the axis of the booster during the ascent stage and in a position turned by 90° during the return flight stage may be provided with four locks and two clamps limiting the position of the wing along the axis of the booster during the ascent stage with matching elements mounted on the oxidizer and fuel tanks.

The axis of the unit for turning the wing may be shifted in respect to the axis of symmetry of the booster and be positioned in the forward portion of the between-tank section.

It is advisable that a wing fairing with forward and rear buildups extending onto the shells of oxidizer and fuel tanks respectively be made on the between-tank section.

Two nacelles may be secured on the between-tank section under the main supports of the landing gear.

The units for joining to the second stage of the launch vehicle may be positioned on the load-bearing unit of the nose component or/and the load-bearing units of the nose compartment and afterbody.

The essence of the invention is that the proposed reusable booster is made in the form of an airplane type flying vehicle capable of ensuring a stable and controllable return flight over a wide range of altitudes and speeds. The presence on the reusable booster of two lifting surfaces (wing and horizontal fin assembly), spaced along the body, provide the necessary stability and controllability at all flight speeds and minimization of the adverse resistance at subsonic flight modes. The accepted traditional airplane scheme is acceptable during motorless descent in the atmosphere at large angles of incidence (to 40°) and is optimum during the return motor flight portion and landing. Making the horizontal fin assembly in the form of a stabilizer with all-moving consoles and the vertical fin assembly in the form of a fin with a maneuvering rudder, which are positioned on the afterbody, provide the necessary balancing according to the moments acting on the booster, retaining reserves as regards deflection for stabilization. Furthermore, the tail fin assembly allows use of its aerodynamic control organs for reducing the angel of deflection of the midflight engine during the ascent stage of the launch vehicle, thus enhancing the efficiency of the midflight engine. Providing the booster with an air-feed jet engine installation ensures return engine flight, which provides the possibility of performing separation of the booster from the second stage of the launch vehicle at great altitudes and flight speeds, at a great distance from the launching point and to thus increase the weight of the useful load put into orbit. Putting the engines of the air-feed jet installation in the nose compartment does not increase the nose resistance of the booster, does not require additional thermal protection of the engines upon reentry into the dense layers of the atmosphere. Furthermore, the position of the aforesaid engines, and also the working tank and the balancing tank in the nose compartment provide the necessary position of the center of mass of the booster in the region of the between-tank section during all models of return flight. Displacement of the exhaust nozzles from the surface of the booster body and deflection of their axes from the surface of the oxidizer tank protects the oxidizer tank from overheating during operation of the engines. Making the dome of the nose compartment in the form of a portion of a sphere with two inlet apertures for the air intakes of the engines of the air-feed jet installation, which inlet apertures are closed by one turning plug provided with a drive mounted in the nose compartment, provides protection of the engines of the air-feed jet engine installation during the stage of ascent and during the initial stage of descent to the moment when the engines are turned on.

Equipping the booster with a jet control system provides the possibility of controlling the booster and its stabilization relative to the center of mass at the initial stage of the return flight after separation from the launch vehicle. Making the jet control system in the form of two removable modules, mounted on the nose compartment, the frame of each of which is made in the form of an aerodynamic dome built into the dome of the exhaust nozzle of the gas line of the air-feed jet engine, does not create additional aerodynamic resistance and ensures rapid removal of the modules, which reduces the time for their technical servicing.

Equipping the fin with four locks to secure it in a position along the axis of the booster during the stage of ascent and in a position turned by 90° during the stage of return flight and clamps limiting the position of the fin along the axis of the booster during the stage of ascent with matching elements mounted on the oxidizer and fuel tanks, provides reliable attachment of the fin relative to the booster body during the stages of ascent and return flight, and also prevention of oscillations of the wing consoles during the ascent stage.

Displacement of the turning axis of the wing from the axis of symmetry of the booster and positioning the between-tank section in the front part provides the possibility of positioning the wing along the body of the booster during the stage of ascent without contact with the front edge of the fin and for a predetermined construction and arrangement of the initial rocket block.

Making a wing fairing on the between-tank section, the outer contour of which fairing has a gradual aerodynamic contour with front and rear buildups, extending beyond the shell of the oxidizer and fuel tanks, respectively, significantly reduces the mutual effect of "booster wing-body" flow.

Attachment of two nacelles on the between-tank section under the main supports of the landing gear ensures the necessary gage of the main supports and their positioning without increasing the dimensions of the between-tank section.

Positioning the elements jointing the booster to the second stage of the launch vehicle on the load-bearing unit of the nose compartment or/and on the load-bearing units of the nose compartment and afterbody provides the possibility for use of the proposed booster both in tandem and in packet launch vehicle schemes.

BEST METHOD OF CARRYING OUT THE INVENTION

A reusable booster 1 comprises a body 2, consisting of a nose compartment 3, a rocket assembly 4 and an afterbody 5, and a complex of means for returning and landing.

A rocket module comprises in its makeup tanks 6 and 7 for the oxidizer and fuel, a between-tank section 8, a midflight liquid propellant rocket engine 9 (LPRE), an airdraulic system for feeding the propellant components and elements of the control system during the ascent stage.

The complex of means for returning and landing makes it possible to carry out flight of the booster after separation from the second stage of the launch vehicle and landing on a standard runway. This complex includes the following:

- a mechanized all-moving wing;
- a tail fin assembly;
- an air-feed engine installation (AJEI);
- a jet control system (JCS);
- a landing gear with a three-point support frame and a parachute-braking installation;
- a mechanism for turning and fixing a wing;
- a mechanism for turning plugs of air intakes;
- a complex of rudder servosystems;
- a borne control complex.

Figure 1:
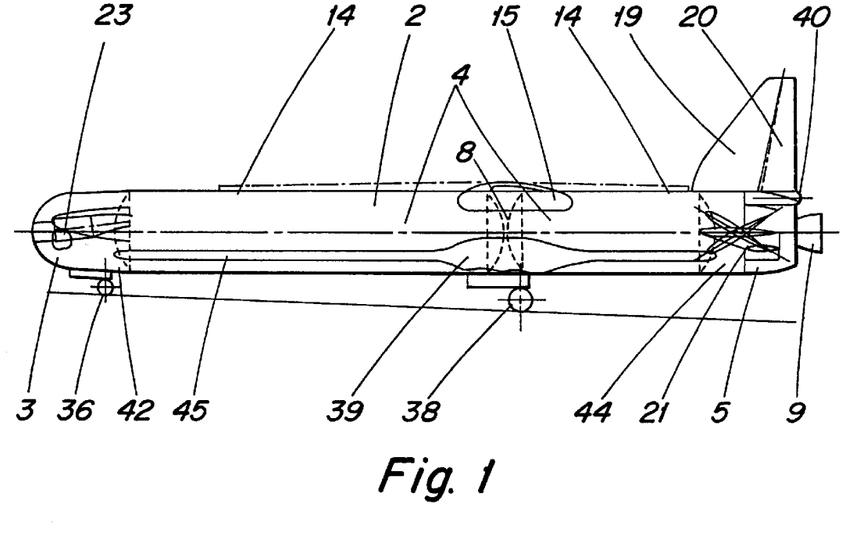
FIGS. 1–3 show the proposed reusable booster of the first stage of a light class launch vehicle, side view, top view and rear view, respectively.
Figure 2:
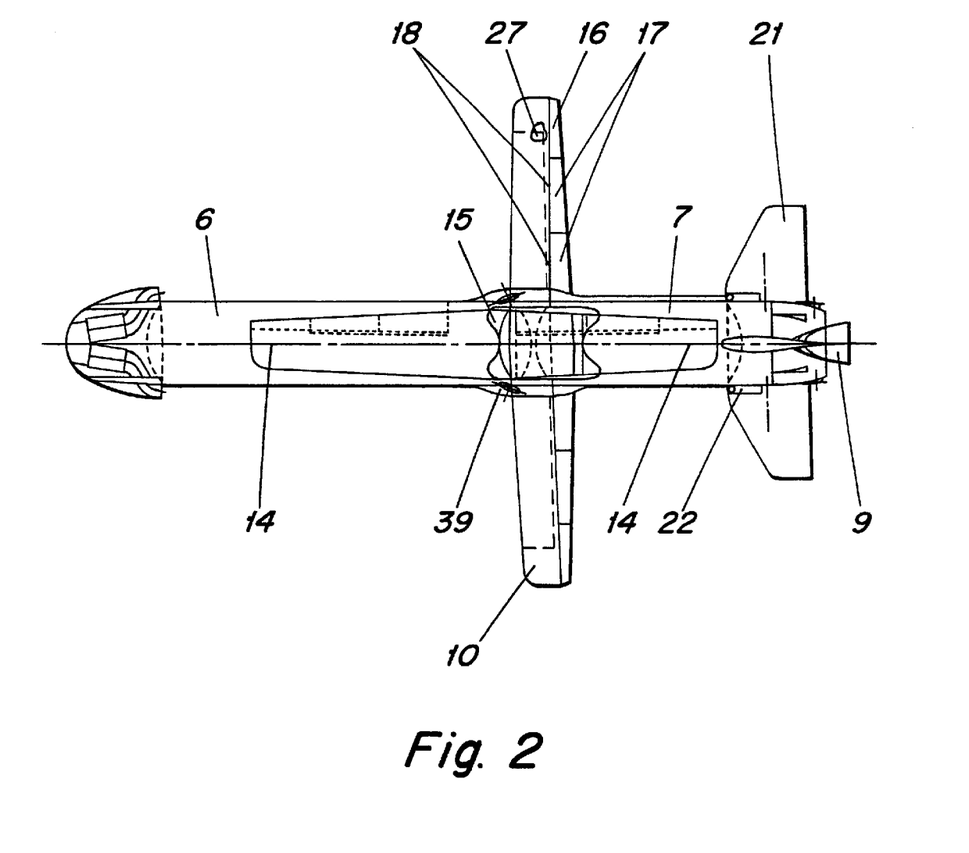
Figure 3:
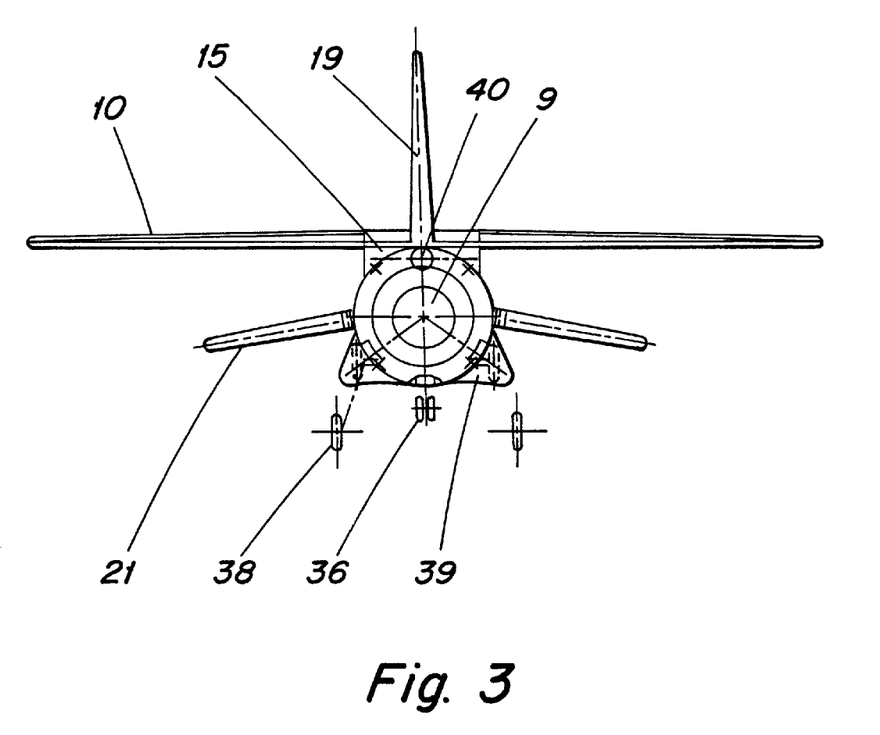
Figure 7:
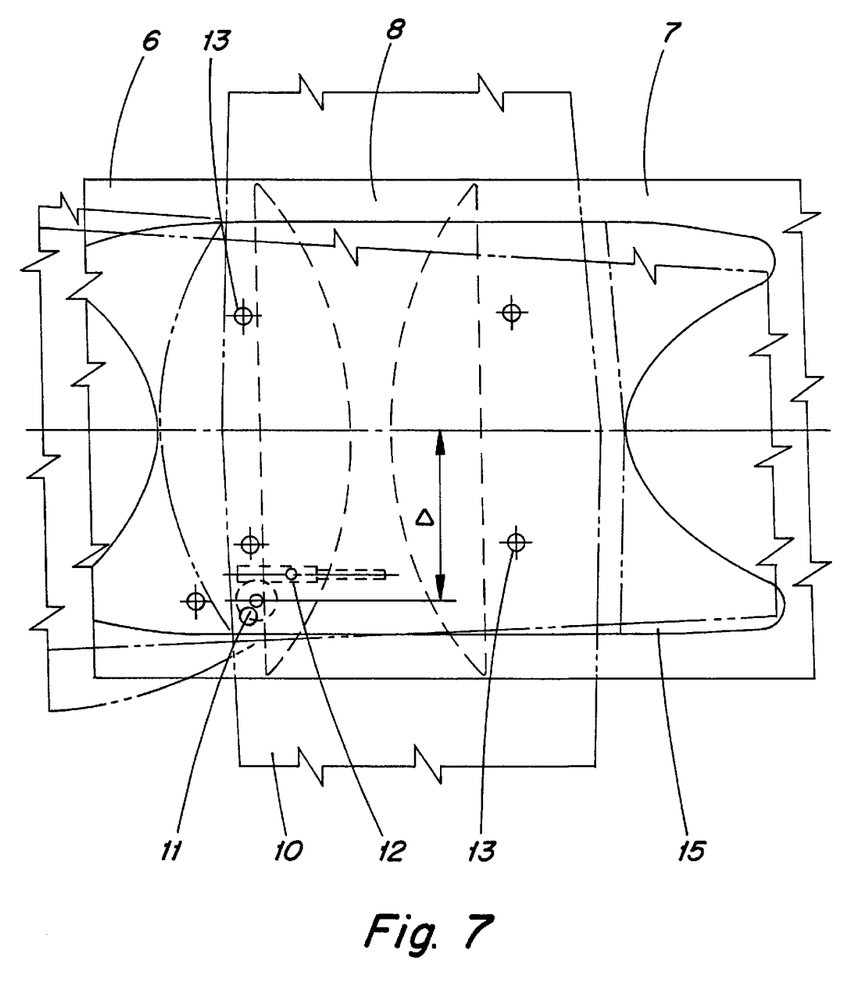
FIG. 7 shows a top view onto the wing fairing (both positions of the wing are shown by dot-and-dash lines)

An all-moving wing 10 is mounted in the upper part of the between-tank section 8 and has two positions: a starting, when it is positioned along the booster (shown in FIGS. 1 and 2 by a dashed line), and a working position ("airplane"), when it is turned by 90°. Transfer of the wing from the start position to the working position is carried out during the exoatmospheric flight stage. In order to achieve this, a unit 11 for turning the wing with a pneumatic drive 12 and four locks 13 for fixing the wing in the aforesaid positions is mounted on the construction of the between-tank section. The wing consoles are provided with locks-limiters 14 of the position of the wing along the axis of the booster during the ascent stage. Matching elements of the fixes are mounted on the oxidizer and fuel tanks 6 and 7 of the rocket block. The wing has a trapezoidal shape in plan with a small sweep angle in respect to the front edge. The axis of the unit for turning the wing is shifted relative to the axis of symmetry of the booster by a distance $\Delta$ and is positioned in the front portion of the between-tank section. On the outer contour of the rocket block in the region of the joint with the wing there is an aerodynamic fairing 15 with front and rear buildups which extend to the shells of the oxidizer and fuel tanks. The wing is equipped with ailerons 16, flaps 17 and interceptors 18.

The tail fin assembly is mounted on the construction of the afterbody 5 and consists of a fin 19 with a maneuvering rudder 20 and a horizontal fin assembly in the form of a stabilizer with all-moving consoles 21. The stabilizer consoles have a trapezoidal shape in plan with a backswept front edge and are mounted with an angle of a negative transverse V. In the root parts of the stabilizer consoles there are recesses for the installation of solid propellant rocket engines 22 (SPRE) to ensure "cold" separation of the first and second stages of the launch vehicle.

The AJEI serves to create the thrust necessary for the return flight of the booster to the zone of the landing airdrome, for the execution of landing maneuvers and landing. The AJEI includes:

two air-feed jet engines 23 (AJE);

two air intakes 24 and two gas line extenders 25 with exhaust nozzles 26;

a propellant system with propellant tanks, pipelines and aggregates;

elements of the system for control of the engine installation.

Figure 4:
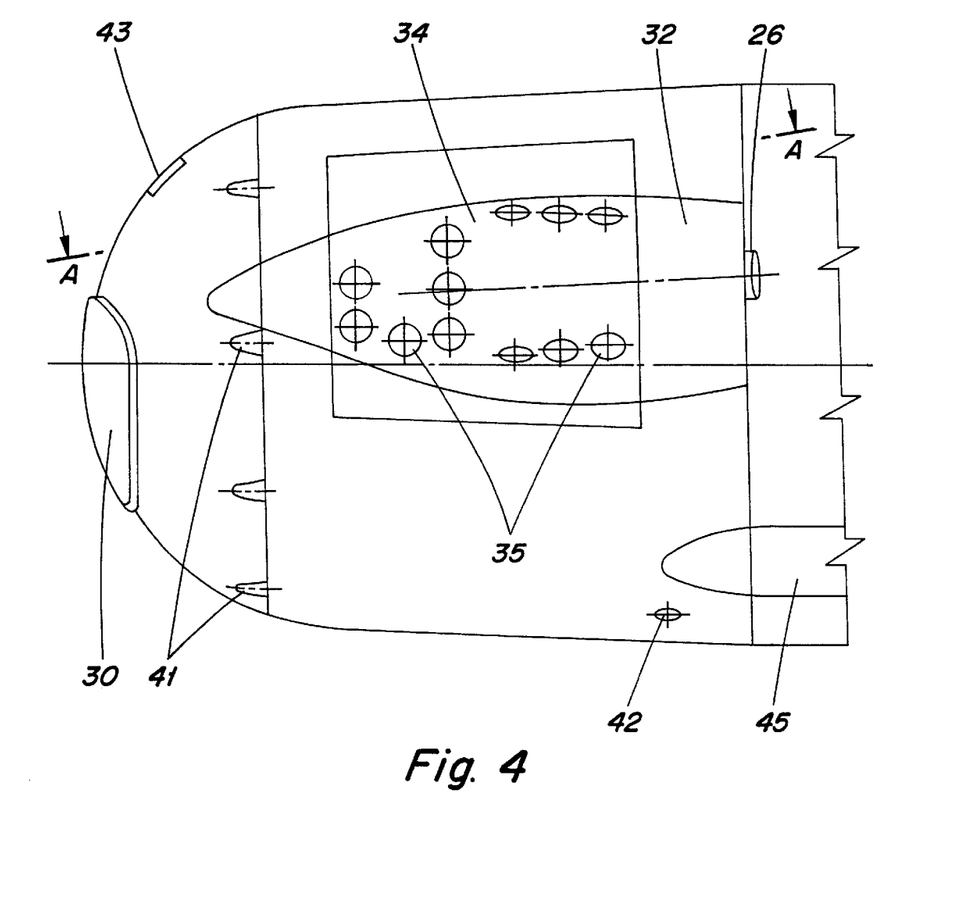
FIG. 4 shows a nose compartment, side view.
Figure 5:
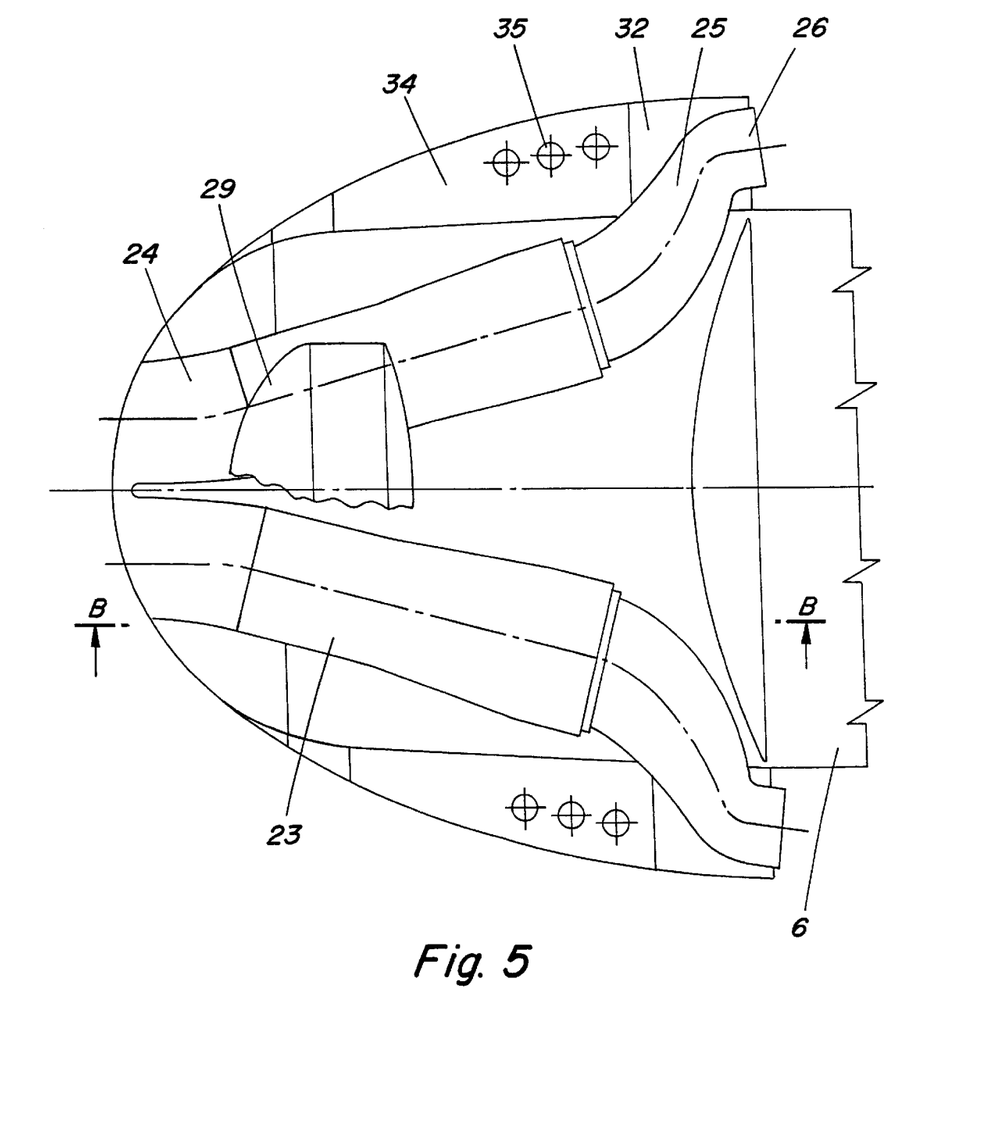
FIG. 5 shows section A—A in FIG. 4.
Figure 6:
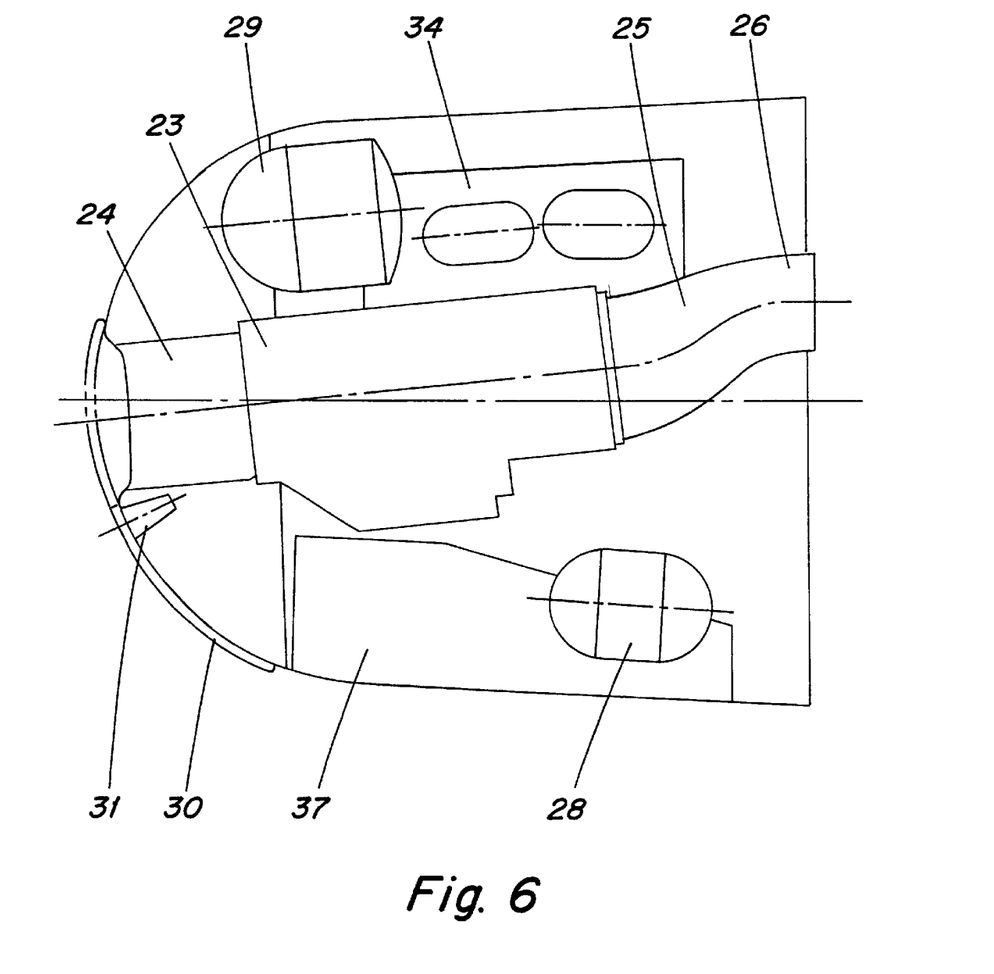
FIG. 6 shows section B—B in FIG. 5.

The engines and main aggregates of the AJEI are positioned in the nose compartment 3. The makeup of the propellant system of the AJEI includes the main tanks 27 positioned in the wing, and also a working tank 28 and a balance tank 29, which are positioned in the nose compartment. The balance tank serves to change the centering of the booster depending on the requirements of longitudinal balance at different flight speeds. Air is fed into the engines through nose, autonomous for each engine, air intakes 24. The air intakes are closed on the passive portions of the flight path, by a turning plug 30 with a drive 31, which opens prior to launching the air-feed jet engine. The exhaust nozzles 26 of the AJE extend beyond the profile of the external contour of the nose compartment 3 and are closed by aerodynamic domes 32. In order to eliminate thermal action of the AJE streams on the shell of the oxidizer tank 6, and exhaust nozzles 26 are shifted from the surface of the body 2 of the booster and their axes are deflected from the surface of the oxidizer tank. This ensures that the shell of the oxidizer tank is not heated to a temperature above a predetermined temperature.

The JCS serves to ensure a controllable flight of the reusable booster from the moment it separates from the second stage 33 in the exoatmospheric section of the flight to entrance into the dense layers of the atmosphere and in the initial stage of atmospheric flight. The JCS is made in module from which provides autonomousity in assembly, turnaround servicing and charging with propellant components. All the aggregates of the JCS are arranged in two removable modules 34 mounted on the nose compartment 3. The aerodynamic dome 32 of the exhaust nozzle 26 of the AJE is the main frame of each JCS module. In order to realize the required stabilization of the booster 1 after separation of the stages and creation of the necessary control moments under conditions of exoatmospheric flight, a group of engines 35 with propellant systems and systems ensuring their functioning is mounted in each module 34.

The landing gear of the reusable booster includes three supports and a parachute-braking system. A front support 36 is positioned in a recess 37 of the nose compartment 3, main supports 38—in nacelles 39 in the region of the between-tank section 8. The parachute-braking system serves to reduce the run distance along the runaway strip. It is arranged in a container 40 which is installed in the upper rear part of the afterbody 5.

The complex of rudder servo systems of the booster serves to move the wing 10, two ailerons 16, four sections of flaps 17, four sections of interceptors 18, consoles 21 of the horizontal fin assembly, maneuvering rudder 20 and front support 36 of the landing gear.

Figures 10, 11:
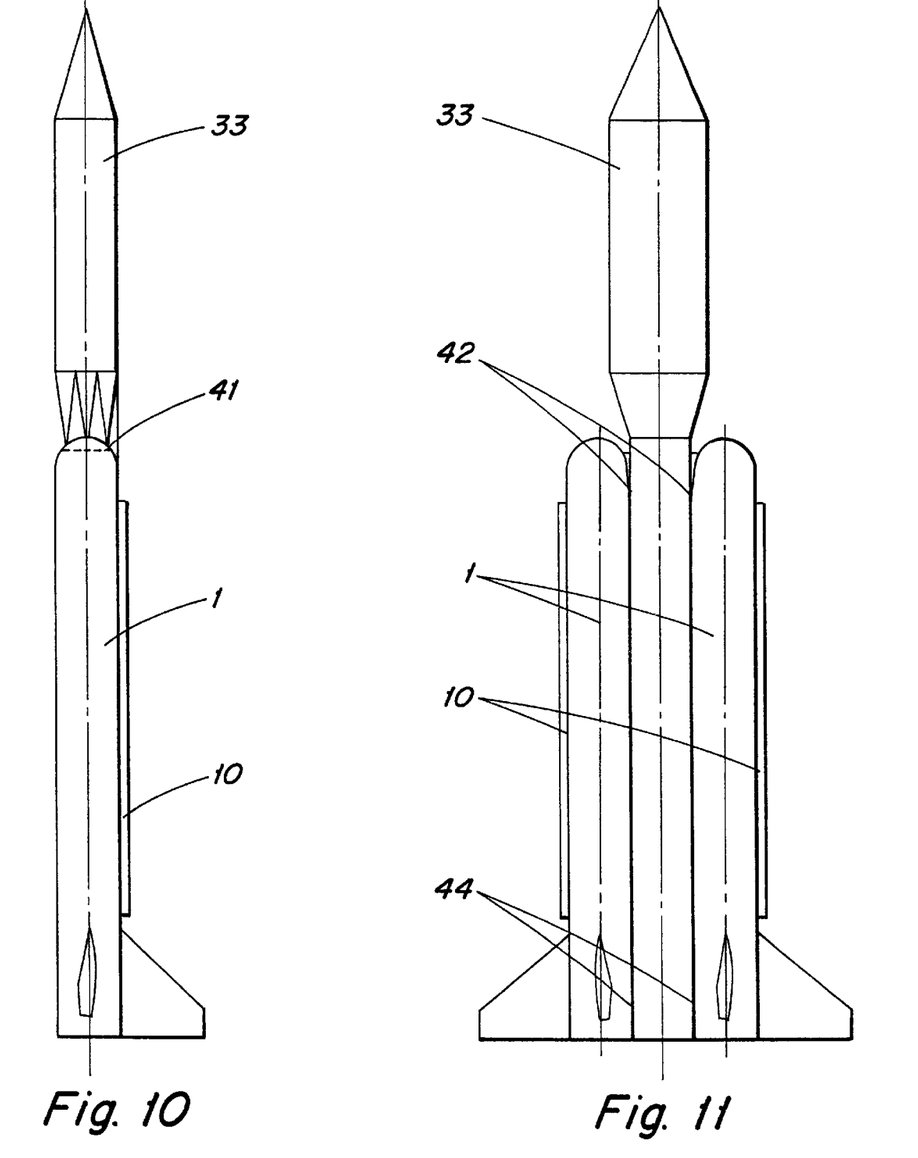
FIG. 10 shows the booster within the makeup of a tandem scheme launch vehicle.
FIG. 11 shows the booster within the makeup of a packet scheme launch vehicle.

The nose compartment 3 joins to the oxidizer tank 6 of the rocket block. Units 41 for joining the first and second stages of the tandem scheme launch vehicle and units 42 for a packet scheme launch vehicle (FIGS. 10 and 11), and also a board 43 of on-board detachable connections of line and communications, providing communication between the systems of the aforesaid stages, are mounted on the load-bearing unit of the nose compartment.

The afterbody 5 is a support element of the launch vehicle during its arrangement on the launch base. In order to reduce the aerodynamic resistance during the return flight the afterbody is made ogived. Units 44 for joining the first and second stages of the packet scheme launch vehicle (FIG. 11) are mounted and control drives for the maneuvering rudder and stabilizer from the makeup of the complex of means for returning and landing are arranged on the afterbody.

In order to lay lines and communications of the booster systems, and also the oxidizer working pipe, two middle fuselages 45, passing along the oxidizer and fuel tanks and made in the form of aerodynamic streamlined runners, are positioned outside the body.

Figure 8:
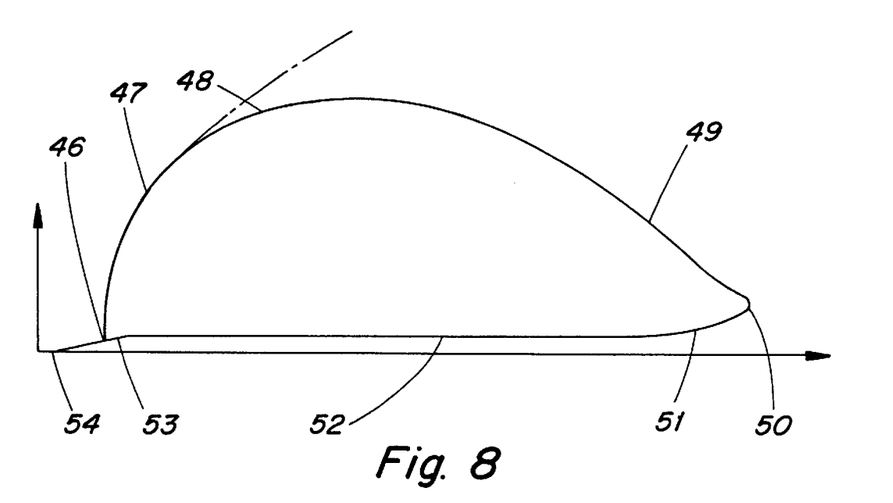
FIGS. 8 and 9 show a vertical projection and a horizontal projection of flight paths of the booster.
Figure 9:
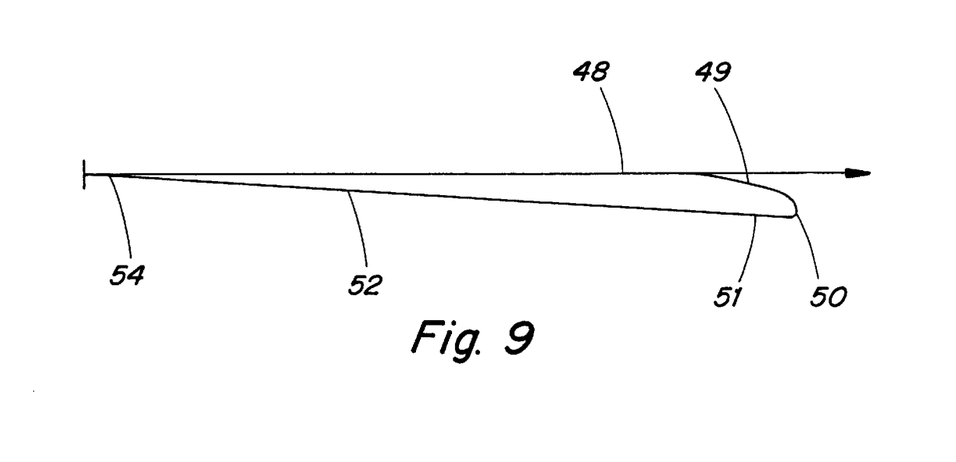

The sequence of operation of the means for returning and landing the reusable booster 1 from the launch in the makeup of the tandem or packet scheme launch vehicle to the start of the landing operation, shown in FIGS. 8 and 9, includes:

launch of the booster in the makeup of the launch vehicle and movement in the active portion until depletion of the reserves of the propellant components (reference numeral 46);

separation of the booster from the second stage of the launch vehicle (reference numeral 47);

ballistic flight of the booster outside the atmosphere (reference numeral 48);

entrance of the booster into the dense layers of the atmosphere (reference numeral 49);

turning by banking (reference numeral 50);

ignition of the AJEI (reference numeral 51);

return engine flight (reference numeral 52);

prelanding maneuver and final approach (reference numeral 53);

landing on runway of launch-landing complex (reference numeral 54).

After the launch vehicle has ascended to the calculated point for separation of the stages (reference numeral 47) and stopping the sustainer LJE of the rocket engine installation 9, separation of the stages takes place according to a "cold" scheme with the aid of the SPRE 22 mounted on the afterbody 5 of the booster 1. During the stage of ballistic flight (reference numeral 48) and prior to the beginning of the efficient operation mode of the organs of aerodynamic control, stabilization and control of the position of the booster is provided by the JCS. During that same stage the wing 10 is transferred to the working position, i.e. to the "airplane" position, by turning it by 90° with the aid of the pneumatic drive 12, and the operations of discharging parts of the remains of propellant components from tanks 6 and 7 of the rocket block and blowing the lines and cavities of the midflight engine LJE are carried out. At the end of the gliding stage banking takes place (reference numeral 50), the steps of opening the air intakes 24 of the AJE 23 by turning the plug 30 with the aid of the drive 31, preparing for air ignition from the autorotation mode and further ignition of the AJE in a range of altitudes of 6–4 km (reference numeral 51) take place. During flight in the atmosphere (reference numeral 52) balancing and control of the booster pitch is provided by the all-moving consoles 21 of the stabilizer. Yawing stability is achieved with the aid of the fin 19 with the maneuvering rudder 20. Control of the banking is accomplished by differential deflection of the stabilizer consoles 21 and the ailerons 16 of the wing 10.

Control of the movement of the booster during all stages of the flight is carried out by a navigational piloting complex included in the makeup of the onboard control complex, which ensures the reception and processing of information from navigational satellites and produces corresponding control signals. The flight ends with a landing on the runway strip of the launch-landing complex (reference numeral 54) and turning off the AJE 23. After termination of the flight, steps are carried out dealing with turnaround servicing of the booster and its preparation for subsequent use.

INDUSTRIAL APPLICABILITY

Aggregates and elements of the construction of the proposed reusable booster are widely used in rocket-spaced and aeronautical engineering. Therefore the claimed invention may be implemented at rocket-space and aeronautical factories with the use of modern materials and technologies.

What is claimed is:

1. A reusable booster of the first stage of a launch vehicle, comprising a body including tanks for oxidizer and fuel, a nose compartment with a dome, a between-tank section and an afterbody, a rocket engine installation, a straight all-moving wing with a unit for turning it and fixing in a position along the axis of the booster during the ascension step and in a position turned by 90° during return flight, horizontal and vertical fin assemblies, a triple-point support landing gear consisting of two main supports mounted on the booster body, and a front support positioned in the nose-compartment, aerodynamic control organs and units for jointing to the second stage of the launch vehicle, characterized in that it is provided with an air-feed jet engine installation, comprising two engines with air intakes mounted in the nose compartment, and a propellant system with the main propellant tanks in the wing, working and balancing tanks in the nose compartment, wherein a wing is mounted on an upper surface of the booster body in the area of the between-tank section, a horizontal fin and a vertical fin are mounted on the afterbody and are made respectively in the form of a stabilizer consisting of two all-moving consoles with a small negative V-shaped angle, and a fin with a yaw rudder, the engines of the air-feed jet installation are provided with gas-line extensions with exhaust nozzles extending beyond the bypasses of the external contours of the nose compartment and closed by aerodynamic domes, said exhaust nozzles are shifted from the surface of the booster body and their axes are deflected from the surface of the oxidizer tank, the dome of the nose compartment is made in the form of a portion of a sphere and has two inlet apertures for said air intakes, closed by one turning plug provided with a drive mounted in the nose compartment.

2. A booster according to claim 1, characterized in that it is provided with a jet control system during the exoatmospheric portion of the return flight and during the initial stage of the atmospheric flight, the jet control system consisting of two removable modules, each of which is arranged inside the dome of the exhaust nozzle of the engine of the air-feed jet installation.

3. A booster according to claim 1, characterized in that the unit for fixing the wing in a position along the axis of the booster during the ascent stage and in a position turned by 90° during the return flight stage is provided with four locks and two clamps limiting the position of the wing along the axis of the booster during the ascent stage with matching elements mounted on the oxidizer and fuel tanks.

4. A booster according to claim 1, characterized in that the axis of the unit for turning the wing is shifted in respect to the axis of symmetry of the booster and is positioned in the forward portion of the between-tank section.

5. A booster according to claim 1, characterized in that a wing fairing with forward and rear buildups extending onto the shells of the oxidizer and fuel tanks respectively is made on the between-tank section.

6. A booster according to claim 1, characterized in that two nacelles are secured on the between-tank section under the main supports of the landing gear.

7. A booster according to claim 1, characterized in that the units for joining to the second stage of the launch vehicle are positioned on the load-bearing unit of the nose compartment or/and the load-bearing units of the nose compartment and afterbody.

\* \* \* \* \*

UNITED STATES PATENT AND TRADEMARK OFFICE
CERTIFICATE OF CORRECTION

PATENT NO.    : 6,454,216 B1
DATED         : September 24, 2002
INVENTOR(S)   : Anatoly Ivanovich Kiselev et al.

It is certified that error appears in the above-identified patent and that said Letters Patent is hereby corrected as shown below:

Column 2,
Line 16, delete "1/100" and insert -- 1/00 --

Column 4,
Line 4, delete "joining" and insert -- jointing --

Column 8,
Line 20, delete "line" and insert -- lines --

Signed and Sealed this

Sixth Day of May, 2003

JAMES E. ROGAN
*Director of the United States Patent and Trademark Office*